United States Patent
Knoblich et al.

(10) Patent No.: US 11,156,824 B2
(45) Date of Patent: Oct. 26, 2021

(54) METHOD AND ADAPTER FOR ADAPTING A MICROSCOPE OBJECTIVE TO A DIGITAL MICROSCOPE

(71) Applicant: Carl Zeiss Microscopy GmbH, Jena (DE)

(72) Inventors: Johannes Knoblich, Jena (DE); Dominik Stehr, Jena (DE); Johannes Winterot, Jena (DE); Thomas Milde, Nausnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 109 days.

(21) Appl. No.: 16/606,175

(22) PCT Filed: May 18, 2018

(86) PCT No.: PCT/EP2018/063179
§ 371 (c)(1),
(2) Date: Oct. 17, 2019

(87) PCT Pub. No.: WO2018/215359
PCT Pub. Date: Nov. 29, 2018

(65) Prior Publication Data
US 2021/0149173 A1    May 20, 2021

(30) Foreign Application Priority Data
May 22, 2017 (DE) .......... 10 2017 208 615

(51) Int. Cl.
*G02B 21/36* (2006.01)
*G02B 21/02* (2006.01)

(52) U.S. Cl.
CPC ......... *G02B 21/365* (2013.01); *G02B 21/025* (2013.01); *G02B 21/362* (2013.01)

(58) Field of Classification Search
CPC ................ G02B 21/365; G02B 21/025; G02B 21/362
(Continued)

(56) References Cited

U.S. PATENT DOCUMENTS

| | | |
|---|---|---|
| 4,515,439 A | 5/1985 | Esswein |
| 4,766,453 A | 8/1988 | Shiokama et al. |

(Continued)

FOREIGN PATENT DOCUMENTS

| | | |
|---|---|---|
| DE | 32 02 461 C1 | 6/1983 |
| DE | 87 01 482 U1 | 3/1987 |

(Continued)

OTHER PUBLICATIONS

International Preliminary Report on Patentability, and English Translation of Written Opinion dated Sep. 27, 2018 in PCT/EP2018/063179.

(Continued)

*Primary Examiner* — Allen C Wong
(74) *Attorney, Agent, or Firm* — Grüneberg and Myers PLLC (57) ABSTRACT

An adapter is suitable for adapting a microscope objective to an electronic interface of a digital microscope. A method includes measuring and storing optical properties of the microscope objective; measuring a storing mechanical properties of the microscope objective; and providing the stored optical and mechanical properties to the electronic interface as optical and mechanical data. The adapter includes a mechanical interface having an adjuster for adjusting the optical components of the standard objective, a digital memory, an electronic interface and at least one electronic component for providing the data of the digital memory to the electronic interface.

19 Claims, 3 Drawing Sheets

(58) Field of Classification Search
USPC .......................................................... 348/80
See application file for complete search history.

(56) References Cited

U.S. PATENT DOCUMENTS

| | | | |
|---|---|---|---|
| 5,703,714 A | 12/1997 | Kojima | |
| 7,088,918 B1 | 8/2006 | Spencer | |
| 7,289,271 B2 | 10/2007 | Muchel | |
| 7,796,352 B2 | 9/2010 | Teich et al. | |
| 8,576,482 B2 | 11/2013 | Saito et al. | |
| 9,001,419 B2 | 4/2015 | Fahlbusch et al. | |
| 9,344,650 B2 | 5/2016 | Winterot et al. | |
| 9,429,740 B2 | 8/2016 | Winterot et al. | |
| 2002/0018291 A1 | 2/2002 | Fukuyama | |
| 2006/0165400 A1 | 7/2006 | Spencer | |
| 2006/0285219 A1 | 12/2006 | Muchel | |
| 2008/0186602 A1* | 8/2008 | Teich | G02B 7/14 359/828 |
| 2010/0309546 A1* | 12/2010 | Seifert | G02B 21/18 359/381 |
| 2011/0069379 A1 | 3/2011 | Becker et al. | |
| 2011/0102572 A1 | 5/2011 | Kihara et al. | |
| 2012/0062987 A1 | 3/2012 | Hnatkovich et al. | |
| 2013/0027768 A1 | 1/2013 | Fahlbusch et al. | |
| 2014/0168404 A1* | 6/2014 | Westphal | G02B 21/245 348/79 |
| 2014/0218793 A1* | 8/2014 | Mcmahon | G02B 21/06 359/385 |
| 2014/0313589 A1 | 10/2014 | Winterot et al. | |
| 2015/0036027 A1* | 2/2015 | Winterot | H04N 5/357 348/240.99 |
| 2015/0145982 A1* | 5/2015 | Okabe | G01J 3/00 348/80 |
| 2015/0260652 A1* | 9/2015 | Verstegen | G01N 21/645 356/311 |
| 2016/0033751 A1* | 2/2016 | Ueno | B01L 3/5085 348/79 |
| 2016/0061717 A1* | 3/2016 | Bawolek | G02B 21/16 356/402 |
| 2017/0264876 A1 | 9/2017 | Gaiduk et al. | |
| 2017/0363547 A1* | 12/2017 | Otani | G01N 21/21 |
| 2020/0084379 A1* | 3/2020 | Ikeda | A61B 1/00188 |

FOREIGN PATENT DOCUMENTS

| | | |
|---|---|---|
| DE | 10 2004 048 099 A1 | 4/2006 |
| DE | 10 2006 001 722 A1 | 8/2006 |
| DE | 10 2007 006 066 A1 | 8/2008 |
| DE | 10 2007 006 066 B4 | 10/2008 |
| DE | 10 2010 001 604 A1 | 8/2011 |
| DE | 10 2013 006 999 A1 | 10/2014 |
| DE | 10 2010 039 746 B4 | 2/2016 |
| DE | 10 2014 112 285 A1 | 3/2016 |
| EP | 2 833 185 A1 | 2/2015 |
| WO | WO 2005/088378 A1 | 9/2005 |
| WO | WO 2009/152208 A1 | 12/2009 |
| WO | WO 2011/095609 A1 | 8/2011 |

OTHER PUBLICATIONS

German Search Report dated Jan. 11, 2018 in German Application No. 10 2017 208 615.7.
International Search Report dated Sep. 27, 2018 in PCT/EP2018/063179 with English translation.
Written Opinion dated Sep. 27, 2018 in PCT/EP2018/063179.

* cited by examiner

METHOD AND ADAPTER FOR ADAPTING A MICROSCOPE OBJECTIVE TO A DIGITAL MICROSCOPE

CROSS-REFERENCE TO RELATED APPLICATIONS

This application is a National Stage entry under § 371 of International Application No. PCT/EP2018/063179, filed on May 18, 2018, and which claims the benefit of German Application No. 10 2017 208 615.7, filed on May 22, 2017.

BACKGROUND OF THE INVENTION

Field of the Invention

The invention relates to a method and an adapter for adapting a standard analog microscope objective, referred to hereinafter by the general term microscope objective, to a digital microscope.

Description of the Background

Interfaces and coupling points, including of an electronic type, for microscope objectives and camera lenses are known in general from the prior art.

Microscope users often have in their possession quite a large number of objectives, which they would like to continue also using on the new digital microscopes. There is therefore the desire to be able to operate traditional, coded or non-coded microscope objectives or special objectives of various manufacturers on a digital microscope.

DE 3202461 C1 describes a mechanical adaptation of the objective by way of a bayonet on the objective turret of a microscope. The objective may bear a coding for encrypting technical data, which during the inward pivoting of the turret can be detected by a reading device fixed to the housing and can be used for controlling functions of the unit.

DE 10 2006 001 722 A1 discloses a connection device for a camera with automatic exposure mode on an optical system. An adapter tube is fastened by a first end to the camera and a second end to the optical system as a mechanical/electrical connection. A connection element arranged at the first end has a multiplicity of electrical contact pins, which interact with the corresponding electrical contacts on the camera.

DE 10 2004 048 099 A1 describes an optical-unit or optical-unit-attachment component, which is suitable for being fitted in a microscope and provided on which are an electronic memory module and two contact areas that are electrically connected to terminals of the memory module 15 and by way of which the memory module can be electrically contacted and supplied with energy once the component is fitted. In this way, a component identification is realized.

WO 2011/095609 A1 describes a mechanical-electronic bayonet interface for microscope objectives. This mechanical interface can also be used for transferring data or supplying electrical power to the coupled optical component.

DE 8 701 482 U1 describes a bayonet mount structure for an interchangeable lens of a photographic camera. On the bayonet mount structure there are also electrical contacts, in order to connect an electrical circuit located in the lens to an electrical circuit located in the camera housing, and thereby allow the exchange of information necessary for the auto-focusing mode.

DE 10 2007 006 066 B4 may be mentioned as representative of numerous objective adapters described in the patent literature. This arrangement relates to a device for quickly changing objectives, comprising a threaded fastening on an optical unit by means of coupling a bayonet connector with a bayonet receptor.

U.S. Pat. No. 5,703,714 A describes a microscope system which controls optical elements, such as the brightness of an illumination device or stops, in dependence on the observation conditions. Setting conditions are stored in tables in a memory of the system.

DE 10 2010 001 604 A1 discloses a fastening device for the easy and exact fastening of an objective on the stand or turret of a microscope, which may also have an electrical interface for component identification and a data memory.

BRIEF SUMMARY OF THE INVENTION

The object of the invention is to make a traditional coded or non-coded microscope objective or a special objective of any manufacturer usable on a digital microscope.

The object s achieved according to the invention by a method comprising measuring and storing at least one optical property and at least one mechanical property of a microscope objective, and providing these properties to an electric interface, and by an adapter a mechanical interface, a digital memory, an electronic interface, and at least one electronic component for providing the data of the digital memory to the electronic interface.

This is not a matter of a simple mechanical, optical and electronic adaptation of the objectives to the digital microscope, but rather a matter of aiming to achieve a complete integration of these objectives by way of an intelligent adapter and to achieve an interface by means of interaction by way of the system firmware and software into the overall digital-microscopic system.

A method according to the invention for adapting a standard objective to an electronic interface of a digital microscope comprises the steps of measuring and/or reading out and storing optical properties of the standard objective; measuring and storing mechanical properties of the standard objective; providing the optical and mechanical data to the interface.

DETAILED DESCRIPTION OF THE INVENTION

In a preferred embodiment of the method, the optical properties are selected from the group: imaging scale β, distortion characteristic, longitudinal chromatic: aberration, transverse chromatic aberration, centration error (lateral image instability). A person skilled in the art is familiar with such optical specifications, the designations of which may also differ between different manufacturers.

In a preferred embodiment of the method, the mechanical properties are selected from the group: working distance, connection size, connection type, installation length and optical parfocal length. The connection size is for example a thread size or a connection diameter. The connection type may be defined for example by a thread, bayonet or the like. The optical parfocal length may be described by the installation length and the front focal distance. A person skilled in the art is familiar with the mechanical properties of the objectives and can make a correspondingly required choice.

In a further preferred embodiment of the method according to the invention, the optical and/or mechanical properties are used to determine correction data that are required for adapting the way in which the digital microscope operates to the microscope objective.

At this point, the following may be mentioned by way of example as correction data: Δ imaging scale, color magnification difference, lateral image offset, distortion, longitudinal chromatic aberration, focus correction. A person skilled in the art is familiar with these specifications and terms and, with knowledge of the systems, can easily determine and apply correspondingly required correction data.

In a further preferred embodiment, the correction data are provided to the electronic interface. These data may for example be introduced into the microscope software as an update or be continuously inquired from the interface during the operation of the digital microscope.

In another advantageous embodiment, identification data of the microscope objective are transmitted to the electronic interface. In this way, the digital microscope can for example perform or prohibit defined operating sequences for the respective objective (for example fluorescence, phase contrast, illumination control, component identification).

With knowledge of the optical and mechanical properties of the microscope objective and the digital microscope, a person skilled in the art can determine a required optical adaptation with various aids of optical unit design.

An adapter according to the invention for coupling a microscope objective with a digital microscope comprises a mechanical interface with adjusting means for adjusting the optical components of the standard objective; a digital memory and an electronic interface and at least one electronic component for providing the data of the digital memory for the electronic interface.

Advantageous configurational variants of the invention are also specified in the referred embodiments.

The advantages of the invention can be seen in particular in that the customer can use its existing (expensive) objectives with the latest digital microscopes.

Figure 2:
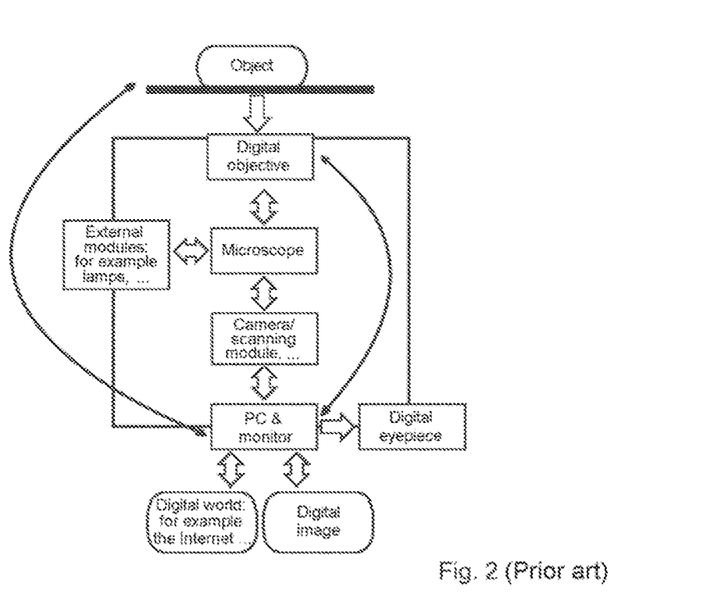
FIG. 2: shows a system structure of a digital microscope according to the prior art.

A typical system structure and the basic operating principle of digital microscopy are represented in FIG. 2; such a system structure is understood as a digital microscope in the context of the present invention. The simple coupling of a classic microscope with a digital camera or digital image sensor is expressly not understood as a digital microscope in the context of the present invention.

An adapter according to the invention consequently offers the same functionality for a conventional objective as a digital objective, i.e. as an objective that is suitable for use on a digital microscope that has internally stored the actual data of the optics and mechanics, which consequently can be used in the digital microscope for improving or optimizing the imaging and the application. The coding and associated possibility of internal storage of current, actual optical objective data (for example actual working distances, front focal distances, actual imaging scales, actual optical correction states or else more complex characteristics, such as for example the actual Streh intensity ratio as the sum of squares of the actual Zernike coefficients) allows the possibility of using these actual data for optimizing the imaging. This may take place for example by a system offset or a variable, application-related control of optical working points (for example application-related optical wavelengths), by a sensor-supported internal measurement of the optical objective qualities or else an ongoing calculation of the live image.

In this way, by taking into account the actual, exemplary residual optical aberrations of the microscope objective equipped with the adapter or of the digital objective and their downstream coded optical systems (for example tube lenses or optical zoom systems), errors can be compensated within certain limits and used in the sense of improving the digital imaging.

Thus, for example, by storing distortion characteristics of the standard analog microscope objective in the memory of the adapter, a computational distortion correction can be carried out digitally, i.e. non-optically, with less expenditure, with the inclusion of the downstream optical zoom system.

Further possibilities of residual optical aberration compensation are provided by adaptive, dynamic optical elements (for example displaceable lenses), which are additionally arranged in the adapter and with which changes in the temperature and/or refractive index of immersion media or a change in the thickness of the coverslip can be corrected within defined limits. In this way, consistently high image quality can be guaranteed by a digital readjustment of optical parameters.

According to the invention, the adapter allows the purely optical-mechanical system of traditional microscope objectives to be used as a digital objective with its essential features:

- a complex optical-mechatronic system, comprising optical, mechanical, electronic subassemblies and also firmware/software functions,
- a mechanical-electronic interface (for example multi-contact E-bayonet interface) for defined optical-mechanical positioning of the objective on the microscope, for supplying energy and for data exchange,
- storage of identification data, actual optical data or measured data, electronic system components—definition for example as a CAN—component,
- optional integration of further functions, such as for example illumination devices (bright/dark-field illumination, segment illumination), sensors (proximity sensor, active preparation/collision protection, active compensation mechanisms, such as for example autocorrection, autofocus, auto-immersion function, internal focusing, active image stabilization, overview sensor, additional optical interface for coupling in light),
- integration of the processing operations (processors and corresponding processor-near electronic hardware), in order that the specific objective-dedicated data can be read into the overall microscopic system, even when an objective is being changed.

The interaction of all the coded microscopic system components, including the digital objectives or microscope objectives upgraded with the adapter according to the invention, in an internal microscopic network allows optimization of the system in a way corresponding to the stored system algorithmics (in firmware or software) to be carried out in the sense of an optimum image creation process either as a one-off system calibration or one-off system offset or as an ongoing process in the digital quasi real-time image generation. The coupling out and representation of the digital images or image data on a monitor, all-in-one PC, tablet PC or smartphone, and also the integration in surrounding networks, clouds, databases or the Internet, takes place exclusively by way of known digital interfaces (for example USB, Ethernet, W-LAN or mobile technologies for relatively large data volumes such as for example UMTS, HSPA, LTE).

In this way, the classic, rather static and technology-oriented microscopic system of a preferably stand-alone solution of a microscope digital-camera PC digital network develops into an increasingly "thinking system", of a modern, purely application-related smart digital system solution with all of its advantages mentioned.

Figure 1:
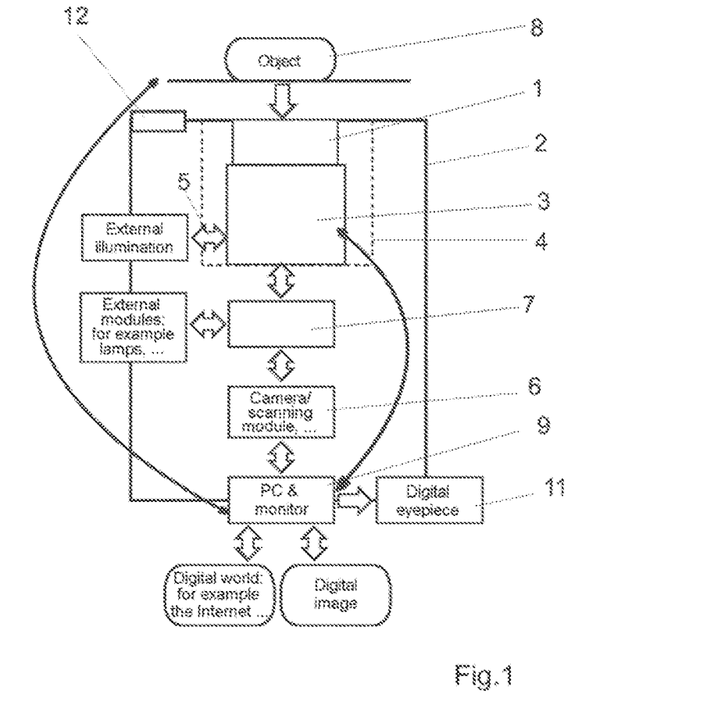
FIG. 1: shows a basic diagram of a digital microscope and integration of an analog microscope objective by means of an adapter according to the invention.

FIG. 1 shows a basic diagram of the integration of an analog microscope objective 1 into a digital microscope 2, here in a variant of an inverted microscope. According to the invention, the microscope objective 1 is coupled to the digital microscope 2 by means of an adapter 3, so that it performs the full functionality of a digital objective 4. Details of this coupling are explained in greater detail later.

The adapter 3 has a mechanical interface function, with preferably the following selectable features (individually or in combination):
- adaption of a thread connection (for example M27×0.75) to a bayonet connection,
- adaptation of different types of objective threads and diameters,
- compensation for different objective transmission lengths (for example 45 mm to 60 mm),
- possibility of centration of the optical core system,
- advantageous defined azimuthal alignment and adjustability of the optical core system,
- collision and preparation protection,
- possibility of mechanically receiving and integrating optical correction elements, optical contrast devices, illumination devices and also a mechanical interface 5 for coupling in light from external illumination devices,
- mechanical-optical adaptation of outside systems (special objectives, for example telecentric objectives, long-distance objectives, for example from the company MITUTOYO, EDMUND OPTICS or other manufacturers).

The mechanical interface function of the adapter comprises the mechanical adaptation of the objective to the mechanical digital-microscope objective interface with regard to the precise positioning, if required also the adjustability, of the optical objective system to the optical system of the digital microscope 2 (for example zoom system or tube lens) or in the case of finite-imaging objectives directly to the integrated sensor 6 of the digital microscope. In the case of an additionally required optical adaptation of the microscope objective 1 to the optical system of the digital microscope 2, the adapter 3 undertakes the precise positioning and centration of this additional optical unit between the objective 1 and an optical system 7 of the digital microscope 2 if appropriate, further optical elements, for example POL filters, DIC prisms or adaptive optical elements, are also mechanically held in the adapter 3 and positioned in the adapter 3.

The adapter 3 also provides sufficient mechanical installation space, in order that integration of the entire required electronic hardware, such as for example controller and processing circuit boards, electrical drives, LED/OLED illumination devices and electronic sensor systems, can take place in a manner that saves as much space as possible.

The adapter 3 also has an optical interface function, which is characterized by the following features (individually or in combination).
- if need be: adaptation of the microscope objective by an optical correction element for communicating different definitions of the interface between an objective and a tube optical unit of the microscope and the pupil position of the objective (for example for ZEISS objectives as described inter alia in WO 2005/088378 A1),
- if need be: integration of dynamic or adaptive optical units or stops for specific correction tasks,
- internal focusing,
- illumination adaptation (dark-field objectives, for example integration of an LED ring),
- optical contrasts: for example DIC/POL integration,
- additional optical interface (for example for coupling in light for fluorescence contrast),
- integration of a phase plate for optical wavefront manipulation,
- specific optical-mechanical adaptation of outside or catalog objectives (objectives of other manufacturers), i.e. objectives that do not correspond to the optical concept of the digital microscope,
- data storage in the memory (theoretical or actual, specific data), such as for example:
  - imaging scale,
  - working distance,
  - distortion correction,
  - reflection correction,
  - storage of different PSFs,
  - storage of actual optical Strehl intensity ratios or of the actual Zernike coefficients,
  - transverse chromatic aberration correction,
  - storage of illumination characteristics,
  - setting of optical working points,
  - adaptive corrections,
  - optical-mechanical corrections, such as for example image instability correction.

The adapter 3 also has an electronic interface function, which is characterized by the following features:
- supplying electrical power to the adapter for illumination, processing, algorithmics, data storage, motor systems and sensor systems,
- memory, processor and controller integration (to minimize installation space, configured using SMD technology on miniaturized, large-scale-integrated circuit boards, for example using multilayer and/or Starrflex technology),
- definition of a communication standard, for example CAN 29, matching that which is used in the digital microscope 2,
- electrical signal transmission by way of mechanical contacts, such as for example spring-loaded contacts from the company PRECI-DIP or the use of modern media technologies, such as for example NFC technology,
- sensor systems: distance sensor, proximity sensor, temperature sensor, overview sensor, electronic hardware prerequisites for updatability of firmware and software, electronic hardware prerequisites for set-ups—for mechanical, optical, illumination-side calibration of the objective 1 in cooperation with the digital-optical system including serviceability/emote diagnostics (for example by AXEDA Remote Service) or remote control.

The storage function of optical and/or systemic parameter data may be mentioned as an example of the aforementioned electronic interface functions of the adapter. These are listed by way of example in Table 1 for the adaptation of a 5× objective with its actual optical parameters and an LED illumination that is to be integrated and is controllable. At the same time, the parameter file definitions of the data are derived, and are then stored in the memory (for example EPROM) of the objective interface during a calibrating process.

On the basis of this system derivation, the module or component interfaces are newly defined, that is to say it is possible to dispense with optical interfaces that are not absolutely necessary, the proportion of optical "hardware" is reduced and the function-supporting optomechanics are restricted to the amount required. With knowledge of the optical system, many optical aberrations or deviations can be corrected by modern image processing, so that complex correction optics are not required. In this way, along with the gain in performance, a minimum of costs for the optomechanical system can be achieved. In the case of light-sensitive microscopic applications (for example fluorescence or multiphoton microscopy), the reduction in the glass transmission losses as a result of "less optics" in the overall image-transmitting system brings clear advantages in sensitivity.

In the course of improving the image and performance, and also minimizing data loss and much faster and better-

TABLE 1

| Parameter | data type | number | size (each) byte | size (total) byte | range | unit | comment | example |
|---|---|---|---|---|---|---|---|---|
| serial number | long | 1 | 4 | 4 | | | | 123456789 |
| lens type | byte | 15 | 1 | 15 | | | | 432038-9000-000 |
| β scale factor | float | 1 | 4 | 4 | | | true β | 5.123456 |
| Transfer length | float | 1 | 4 | 4 | | mm | lens I/F to focus | 5.123 |
| pupil distance | float | 1 | 4 | 4 | | mm | lens type depending | 5.123 |
| working distance | float | 1 | 4 | 4 | | mm | lens mech. to focus | 22.123 |
| image stability | float | 2 | 4 | 8 | | mm | x,y optics to mech. 0.0 | 0.012 |
| distortion | float | 100 | 4 | 400 | | | coefficients | 1.123456 |
| CVD | float | 100 | 4 | 400 | | | chromatic magnification difference | 1.123456 |
| LED calibration | byte | 8 | 1 | 8 | 0 .. 100 | % | normalized intensity | 96 |
| total | | | | 851 | | | | |

The digital-microscopic system concept (also see FIG. 2) is defined by considering the entire optical-digital process of creating an image of an object 8 up to the digital imaging on the image sensor 6 and the output by way of one or more digital interfaces, for example on a monitor 9 or a digital eyepiece 11. That is to say that the theoretical linking of a purely optical system with the image sensor 6, including different image acquisition technologies in microscopy, such as wide-field, laser-scanning, spinning-disk, fluorescence microscopy and others, also using digital image processing tools and methods (including hardware and software) independently of the hardware and interface structure of the microscope.

In the sense of system optimization, it is derived which imaging or image-converting function is produced by which means. That is to say that, depending on the optical property and expenditure, for system optimization in the sense of improving the image visualization and/or image information it can be decided whether this property is produced purely optically or with "digital" software tools. The entire optical concept is optimized in terms of the image sensor 6 and the digital image processing components and guarantees a best-possible, low-loss image data transfer up to the visualization on the monitor 9 or other display device and, if appropriate, storage and/or distribution.

quality imaging, the traditional camera interface is replaced by a direct integration of the image sensor 6 in the microscope. The transfer of original PC functions (if using the camera interface) into the surrounding microscope hardware (for example FPGA and media processors for fast real-time imaging and image processing) as an "embedded PC" is achieved.

Powerful firmware and/or software tools allow the digital image to be further improved or calculated in the course of meeting the digital application requirements and to be displayed in quasi real time. The same would not be possible with a traditional digital camera at the camera interface and subsequent image data processing on an external PC, or only with great technical expenditure (extremely powerful and expensive PCs).

The use of the digital eyepiece 11, and if appropriate the use of an additional overview camera 12, which preferably provides overview images of the microscopic object 8 in real time, results in a series of further systemic advantages:

The microscope construction of an upright and inverted type is no longer bound to an ergonomic eyepiece viewing height, thus creating degrees of freedom in the application-related functional structure and saving costs by omitting the otherwise necessary optical tubes and additional optical units. In particular in the case of an inverted microscope, it is possible to dispense with additional intermediate imaging and the additional expenditure for binocular, trinocular or ergo tubes.

By doing away with the optical corrections for the coupling out from the eyepiece, the optical expenditure is reduced still further. Because there is no need to provide the fields of view for classic optical eyepieces, with field diameters of 20 to 25 mm, the imagings on the sensors can be optimally adapted to them without the preceding glass path. There is also a reduction in the expenditure for the adaptation optics for the coupling out from the camera or scanner, mainly by the proportion accounted for by the back-compensation of the optical glass path.

The stand construction is simplified and the accessibility to the samples is improved, in particular in the case of inverted stands, by doing away with the preceding tubes. The microscopic "hardware" does not necessarily have to be directly reachable for the user (looking into the eyepieces), since the interaction of the user now only takes place with the preferably digital input medium, for example the monitor (touchscreen) or other known location-variable digital input devices (touchpads, digital rotary encoders, joysticks, mouse or the like). With desired optical observation by way of digital eyepieces—for example high-resolution miniature display eyepiece observation (with HD, 2K or 4K display technology) or for example a head-up display or VF goggles, or the ZEISS VF ONE as smartphone/smart-app technology—observation and control of microscope functions that is not locationally bound to a stand is possible, since new visualization and control technologies are usually wireless (for example by way of Wi-Fi or Bluetooth) or only wire-bound (for example by way of USB) in being coupled to the stand-alone microscope body.

In FIGS. 3 to 6, various adapter configurations according to the invention are represented as basic diagrams.

There are a multiplicity of different types of objectives, which differ with regard to their optical correction concepts, interface definitions, their imaging scales, their specific optical contrast methods, complexity and technical-application equipment features.

Table 2 shows by way of example an excerpt of available microscope objectives and the great application variety of these microscope objectives.

TABLE 2

| Objective - selection criterion | Objective - configurations |
| --- | --- |
| Objective classes | A-Plan, LD A-Plan, Achoplan/N-Achroplan, W Achroplan/W N-Achroplan, C-Achroplan, Fluar, Ultrafluar, alpha Plan-Fluar, Plan-Neofluar, EC Plan-Neofluar, LD Plan-Neofluar, LCI Plan-Neofluar, LCI Plan-Apochromat, Plan-Apochromat SF20, Plan-Apochromat SF23, Plan-Apochromat SF25, W Plan-Apochromat, C-Apochromat, LD C-Apochromat, Epiplan, EC Epiplan, LD Epiplan, Epiplan-Neofluar, EC Epiplan-Neofluar, LD Epiplan-Neofluar, EC Epiplan-Apochromat |
| Imaging scale | 1.0x, 1.25x, 2.5x, 5x, 10x, 20x, 25x, 32x, 40x, 50x, 63x, 100x, 150x |
| Contrast method/ application | H BrightField, HD BrightField/Dark Field, DIC Differential Interference Contrast, RL DIC Reflected Light DIC, HC DIC High Contrast DIC, C DIC DIC with circular polarized light, |

TABLE 2-continued

| Objective - selection criterion | Objective - configurations |
| --- | --- |
| | PlasDIC Polarization-Optical DIC, TIC Total Interference Contrast, PH Phase Contrast, VAREL Contrast, HMC Hoffmann Modulation Contrast, POL Polarization Contrast, FL Fluorescence, TIRF Total Internal Reflection Fluorescence, Confocal Microscopy, NLO-IR/2 Photon, Apo Tome, Microdissection |
| Technical options | without immersion, water/oil/glycerol immersion, correction function, stop function, LD (Long Distance), configurations of connection thread in W0.8x$\frac{1}{36}$", M27x0.75, M32x0.75, new objectives (on the basis of the correction principle), graduation of the NA (numerical aperture) in the ranges 0.02-0.19, 0.20-0.49, 0.50-0.79, 0.80-0.99, ≥1.00, WD (working distance) ≤1.0 mm, 1.0-4.0 mm, 4.0-10.0 mm, ≥10.0 mm, without coverslip correction, with coverslip correction, variable coverslip thickness correction |
| Special objectives | Telecentric objectives, measuring objectives, zoom objectives, macroscope objectives, stereo microscope objectives |

Figure 3:
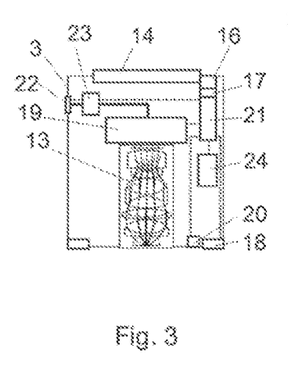
FIG. 3: shows a basic diagram of an adapter in a first embodiment.

In FIG. 3, a first preferred embodiment of the invention is represented. In this case, at least one optical unit 13 of the microscope objective is fitted into the adapter 3 without the original objective housing as an embedded system and is aligned there by mechanical means. The gain in installation space is advantageous here. The adapter 3 also has a mechanical interface 14 for coupling to the digital microscope. An electronic interface 16 serves for communication with and/or supplying energy to the further electronic components in the adapter 3, such as the memory 17, ring illumination 18, contrast module 19, overview camera 20 or control module 21. Communication connections of the control module 21 to the components are represented by dotted lines. The adapter 3 advantageously has an optical interface 22 for the coupling in of light for reflected light illumination and/or an internal reflected-light module 23.

Stored in the memory 17 are actual data of the optical unit 13, which were determined by measurement. The memory 17 may also comprise further information concerning fitted modules and options.

The assembly, measurement, configuration and calibration in this case take place at the factory, i.e. this option is preferably offered by a manufacturer of the digital microscope to which the objective is to be adapted.

For the operation of motorized functional units (for example autofocus) or the integrated ring-light illumination device, either the electronic interface 16 of the adapter 3 must be used not only for providing the electrical contacts intended for data transfer but also additionally contacts that serve for the transmission of electrical energy for providing the required electrical power or the circuitry of the existing contacts must be designed for this. When a contactless technology, such as for example NFC radio technology, is used as the electrical interface, a sufficiently great electrical power transmission must be ensured in the dimensioning of the electrical circuitry for the operation of these energy-intensive functional units.

The possibility of retrofitting optical contrast methods by means of the contrast module 19 in the adapter 3 also provides a technical alternative on digital microscopes that are not originally intended or equipped for POL, DIC or fluorescence contrast. As a result, the application extent of the digital microscopes can be increased significantly. The methods and arrangements of the optical elements of the aforementioned contrast methods are known and are therefore not explained in any more detail here.

The system performance can be further increased and working sequences rationalized by sensors that can be additionally integrated into the adapter, such as for example a distance sensor 24, autofocus sensors or the overview camera 20.

Figure 4:
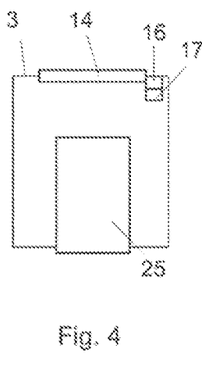
FIG. 4: shows a basic diagram of an adapter in a second embodiment.
Figures 5, 6:
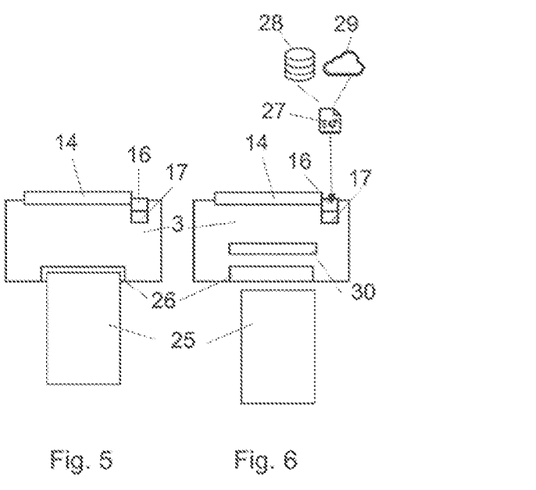
FIG. 5: shows a basic diagram of an adapter in a third embodiment.
FIG. 6: shows a basic diagram of an adapter in a fourth embodiment.

Some of the additional components represented are to be understood as optional components, which may also be present in the embodiments according to FIGS. 4 to 6.

FIG. 4 likewise shows a solution as an embedded system, in which a complete microscope objective 25 is fitted into the adapter 3. Here, too, the assembly, measurement, configuration and calibration preferably take place at the factory.

The integration of the objective at the factory as an embedded system according to FIGS. 3 and 4 has the advantage that all of the necessary adaptation work can be carried out at the factory, such as for example measurement of the microscope objective 25 with regard to its actual optical data,
assembly, adjustment and calibration of the optical unit 13 or the complete microscope objective 25,
if appropriate, integration and adjustment of further optical correction elements or further optical or motorized components and subassemblies,
initial electrical/electronic operation,
update with current firmware and software versions,
adjustment, calibration and testing of the complete system.

With an objective adapted at the factory, for the customer this advantageously does away with additional configuration and calibration of the adapter.

In the configurational variants according to FIGS. 5 and 6, the microscope objectives 25 to be adapted from the manufacturers own specific supply range are coupled as so-called add-on systems to correspondingly configured adapters 3 either at the factory or by the customer. In this case, the adapter 3 has a mechanical interface 26 compatible with the objectives to be adapted, for example a corresponding thread or bayonet. In the case of the factory embodiment (FIG. 5), all of the configuration and calibration tasks are again advantageously performed by the manufacturer and there is no need for further configuration and calibration tasks to be performed by the user. Here, the objective 25 generally can no longer be separated from the adapter 3, i.e. this combination is retained, and the customer cannot operate other objectives on the adapter 3.

The embodiment shown in FIG. 6 is an add-on system, in which the customer can itself perform the mechanical attachment to the adapter 3, and also the configuration and calibration. Here, all of the required data for the microscope objective 25 to be adapted must be available as a file 27, for example as a download from a database 28 or a cloud 29, stored in the memory 17 by way of the electronic interface 16. These are the data that are identical for all objectives of this type, for example designations for identification or optical residual aberration corrections (for example distortion correction), which by way of example only vary slightly. Then there are also individual objective data, which only in a calibrating routine offered by the software/firmware of the digital microscope have to be measured by the customer using a calibrating slide and stored. In a further development stage, it is also possible—if the digital microscope has a corresponding sensor system (for example an integrated wavefront sensor)—that objective image quality criteria describing the quality of the microscope objective 25, such as for example the point-spread function (PSF) or the Strehl intensity ratio (calculated from measured Nijboer-Zernike coefficients), are measured and enter the digital image creation workflow as actual optical system data, or measured optical residual aberrations are corrected within certain limits by way of implemented adaptive optical elements or, as in the case of motorized correction objectives, by way of adjustable lens elements.

This embodiment has the advantage that the customer can use different objectives from its stock with the adapter 3 once it has carried out the updates and calibrating routines described above. It goes without saying that the adapter must have the prerequisites necessary for this on the hardware side, for example the presence of an objective-type-bound or manufacturer-specific correction lens/correction optical unit 30 in the adapter 3 or the corresponding manufacturer-specific mechanical interface 26.

The embodiments according to FIGS. 5 and 6 may also be realized with outside objectives, i.e. objectives from the supply range of other manufacturers, as so-called add-on systems with a correspondingly configured adapter 3 in this case, the adapter 3 has the mechanical interface 26 compatible with the outside objectives, for example a corresponding thread and in most cases a necessary optical adaptation by further optical correction elements.

Decisive for the integration of objectives of other manufacturers into the digital imaging process in digital microscopes is the knowledge and availability of their relevant data. The application range of the digital microscopes is extended considerably by the possibility of integrating suitable objectives of other manufacturers, in particular also special objectives, such as for example telecentric objectives, ID objectives or zoom objectives.

Figure 7:
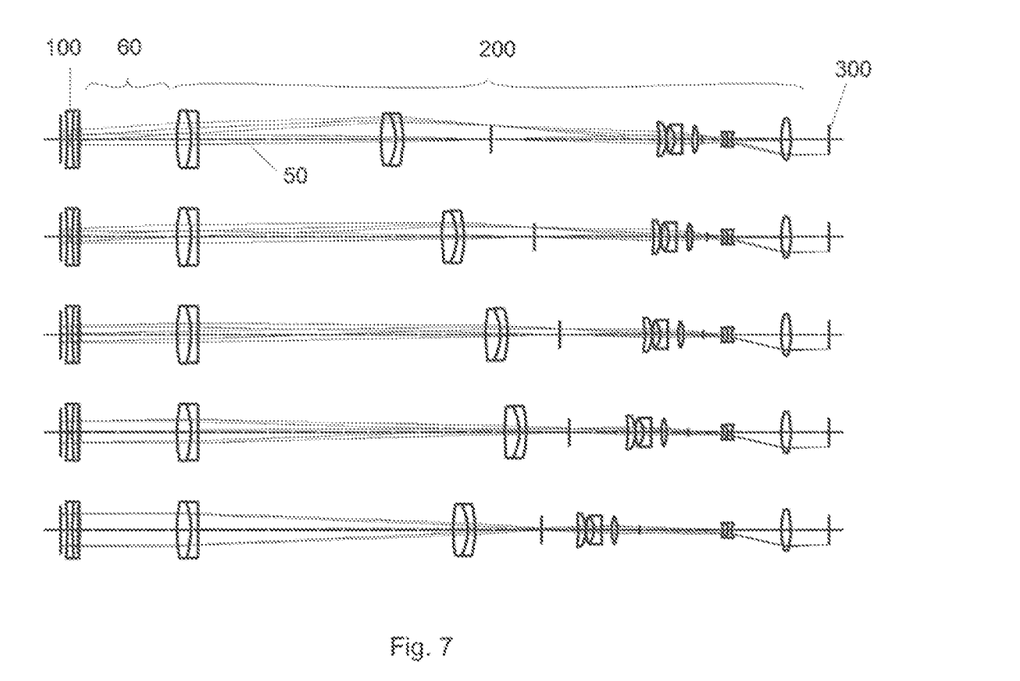
FIG. 7: shows a basic diagram of a first variant of the optical adaptation of the standard objective to the digital microscope.

The optical adaptation of an objective to a digital microscope is to be presented in an exemplary embodiment according to FIG. 7 as representative of the aforementioned different types of optical interface functions.

Microscopes with ∞-objectives comprise the objective and the tube lens as component parts. Between the two is the distance 60 known as infinite space. The magnification is standardized as the ratio of image to object size. The object in this case lies in the vicinity of the front focus of the objective and the image correspondingly lies in the vicinity of the rear focus of the tube lens. With the basic laws of geometrical optics, the image height is to be substituted by the focal length of the tube lens and the object size is to be substituted by the focal length of the objective. For various reasons, tube lenses with different focal lengths and with different corrections are used it is consequently often not possible from optical aspects alone to exchange the objectives without impairing the performance as compared with the basic original configuration. With knowledge of the correction principles of the tube lenses, determination of the difference is possible for mixed set-ups. For some set-ups, there are solutions for correcting non-compatible configurations by adding adaptation elements in the infinite space.

FIG. 7 shows the basic structure of an adapter with an optical correction element 100 in the example of a zoom 200 in a digital microscope (not represented) corresponding to the description in DE 10 2013 006 999 A1 and an objective (not represented) for a tube lens according to the description in Wo2005088378A1 (FIG. 2 there). The zoom 200 forms an image from cc on a sensor 300 in the image plane with variable focal length f zoom, Between the objective and the zoom 200, the optical correction element 100 in the form of an afocal cemented element is arranged in the pupil plane of the zoom 200. The light emitted or reflected by the object and passing through the objective, the correction element 100 and the zoom 200 (beam path represented by 50) is focused in the image plane. The correction element 100 corrects the systematic differences of the aberrations between the objectives designed for the zoom 200 and the objectives designed for WO2005088378A1 FIG. 2. In this example, these are longitudinal and transverse chromatic aberrations and can be corrected by the adapter with the correction element 100. Focus distances and magnification differences are not to be corrected. For this reason, the correction element 100 is designed as afocal with telescope magnification 1.

Figure 8:
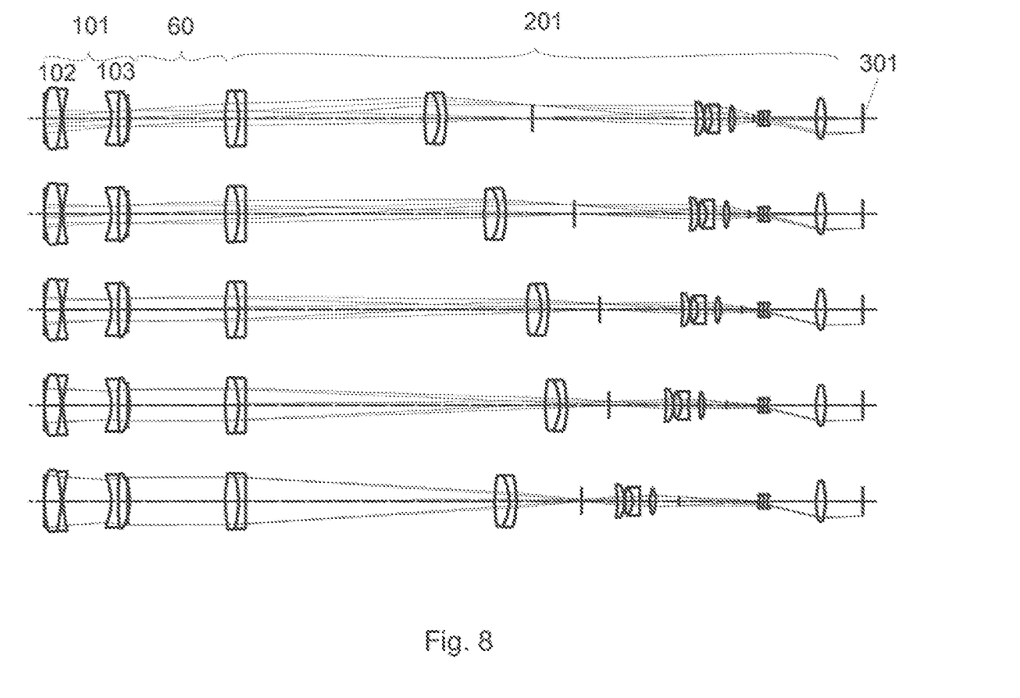
FIG. 8: shows a basic diagram of a second variant of the optical adaptation of the standard objective to the digital microscope.

FIG. 8 shows an arrangement for optical adaptation of an objective to a zoom tube of the digital microscope.

The basic structure of an optical adapter with a correction element 101 in the example of a zoom 201 in the digital microscope corresponding to the description in DE 10 2013 006 999 A1 and an Objective for a tube lens according to the description in U.S. Pat. No. 8,576,482 B2 is represented. The zoom 201 forms an image from ∞ on a sensor 301 in the image plane with variable focal length f zoom. Between the objective and the zoom 201, the afocal optical adapter is arranged as a correction element 101 in the form of a Galilei telescope comprising two cemented elements 102, 103 in the pupil plane of the zoom 201. The light reflected or emitted by the object and passing through the objective, the adapter and the zoom 201 is focused in the image plane 301. The adapter with the optical correction element 101 corrects the systematic differences of the aberrations, between the objectives designed for the zoom 201 and the objectives designed for U.S. Pat. No. 8,576,482 132. These are longitudinal and transverse chromatic aberrations and also a magnification difference and they can be corrected by two achromats or the cemented elements 102, 103. Focus distances are not corrected. For this reason, the correction element 101 is designed as afocal. The magnification difference is eliminated by the telescope magnification of the correction element 101.

In the exemplary embodiments of the U.S. Pat. No. 8,576,482 B2, a tube lens of one manufacturer is disclosed. The details can be seen there in Table 19 and FIG. 25. The differences there are between the tube lens specified there and the correction of the zoom tube (for example from DE 10 2013 006 999 A1) are the focal length, the longitudinal chromatic aberration correction, transverse chromatic aberration correction and image field curvature. These are errors that can be corrected in the infinite space by means of the correction element 101. On the basis of the relation of the focal lengths of the two achromats or cemented elements 102, 103, the correction element 101 corrects the difference in the focal lengths between a reference focal length of the zoom system 201 and the objective corrected to the tube lens from U.S. Pat. No. 8,576,482 B2 2013/11/05. The choice of crown and flint glass in the two cemented elements 102, 103 in combination allows the correction of the other errors mentioned.

The telescope magnification of the correction element 101 is Γ=1.08. Transverse and longitudinal chromatic aberrations as well as coma and astigmatism are significantly reduced. The correction element 101 has virtually no influence on the distortions. These are advantageously digitally correctable.

The correction element 101 comprises a first achromat (cemented element 102) of a positive refractive power with a preceding flint in the converging lens and a second achromat (cemented element 103) of a negative refractive power with an end crown in the converging lens.

The following table specifies a possible exact embodiment of the optical correction element 101 described in FIG. 8. In this case, r is the radius of the respective lens, a the distance from the next lens, $n_e$ the refractive index, $v_e$ the Abbe number of the lens and f" the focal length.

| Radius | distance | $n_e$ | $v_e$ | flens | fgroup | cemented element |
|---|---|---|---|---|---|---|
| 44.050 | 4.717 | 1.65222 | 33.56 | 38.37 | | 101 |
| −55.484 | 2.354 | 1.48910 | 70.23 | −45.68 | 177.57 | |
| 37.935 | 20.000 | | | | | |
| −19.502 | 3.25 | 1.67763 | 32.00 | −26.30 | | 102 |
| 220.56 | 4.156 | 1.49960 | 66.78 | 36.47 | −164.13 | |
| 19.736 | | | | | | |

| List of reference signs | |
|---|---|
| 1 | Microscope objective |
| 2 | Digital microscope |
| 3 | Adapter |
| 4 | Digital objective |
| 5 | Optical interface |
| 6 | Image sensor |
| 7 | Optical unit |
| 8 | Object |
| 9 | Monitor |
| 10 | — |
| 11 | Digital eyepiece |
| 12 | Overview camera |
| 13 | Optical unit component |
| 14 | Mechanical interface |
| 15 | — |
| 16 | Electronic interface |
| 17 | Memory |
| 18 | Ring illumination |
| 19 | Contrast module |
| 20 | Overview camera |
| 21 | Control module |
| 22 | Optical interface |
| 23 | Reflected-light module |
| 24 | Distance sensor |
| 25 | Microscope objective |
| 26 | Mechanical interface |
| 27 | File |
| 28 | Database |
| 29 | Cloud |
| 50 | Beam path |
| 60 | Distance |
| 100 | Optical correction element |
| 101 | Optical correction element |
| 102 | Cemented element |
| 103 | Cemented element |
| 200 | Zoom |
| 201 | Zoom |
| 300 | Sensor |
| 301 | Sensor |

The invention claimed is:

1. A method for controlling operation of a digital microscope, the method comprising:
   providing an adapter configured to interface with different types of microscope objectives, the method using the adapter to perform operations including:
   measuring and storing information indicative of at least one optical property of a microscope objective interfaced to the adapter;
   measuring and storing information indicative of at least one mechanical property of the microscope objective interfaced to the adapter; and providing the information indicative of the at least one stored optical property and the information indicative of the at least one stored mechanical property as optical and mechanical data to an electronic interface of the digital microscope.

2. The method as claimed in claim 1, wherein the at least one optical property is at least one selected from the group consisting of imaging scale, distortion characteristic, longitudinal chromatic aberration, transverse chromatic aberration, and centration error.

3. The method as claimed in claim 1, wherein the at least one mechanical property is at least one selected from the group consisting of working distance, connection size, connection type, installation length, and optical parfocal length.

4. The method as claimed in claim 1, further comprising:
determining correction data from the at least one optical property and/or the at least one mechanical property; and
configuring software of the digital microscope based on the correction data,
wherein configuring the software includes controlling operation of the digital microscope to be compatible with the microscope objective interfaced to the adapter.

5. The method as claimed in claim 4, further comprising providing the correction data to the electronic interface.

6. The method as claimed in claim 1, further comprising transmitting identification data of the microscope objective coupled to the adapter to the electronic interface.

7. The method as claimed in claim 1, wherein:
at least an optical unit of the microscope objective is interfaced to the adapter, and
the adapter comprises at least one memory and an electronic interface.

8. The method as claimed in claim 1, wherein the microscope objective is flange-mounted by an existing mechanical interface of the microscope objective onto the adapter housing, and wherein the adapter housing comprises at least one memory and the interface.

9. The method as claimed in claim 1, further comprising determining an optical adaptation to the digital microscope.

10. An adapter for a digital microscope, the adapter comprising:
at least one interface configured to interface with different types of microscope objectives, the at least one interface comprising a mechanical interface comprising an adjuster configured to adjust one or more optical components of microscope objective interfaced to the adapter;
a digital memory;
an electronic interface; and
at least one electronic component configured to provide the data of the digital memory to the electronic interface.

11. The adapter as claimed in claim 10, wherein the mechanical interface has a thread connection on an objective side and a bayonet connection on a microscope side, facing away from the objective side.

12. The adapter as claimed in claim 10, further comprising a device for collision protection.

13. The adapter as claimed in claim 10, further comprising an optical correction element for focal length and/or color correction.

14. The adapter as claimed in claim 10, further comprising an illumination device.

15. The adapter as claimed in claim 10, further comprising a coupling element for the coupling in illumination light.

16. The adapter as claimed in claim 10, further comprising a contrast module.

17. The adapter as claimed in claim 10, further comprising an optical phase shifter element.

18. The adapter as claimed in claim 10, further comprising a control module configured to control at least one electronic component.

19. The adapter as claimed in claim 10, wherein the electronic interface is compatible with a predetermined communication standard.

* * * * *